(12) United States Patent
Reitz et al.

(10) Patent No.: US 7,731,202 B2
(45) Date of Patent: Jun. 8, 2010

(54) STABILIZER FOR A MOTOR VEHICLE

(75) Inventors: Peter Reitz, Neukirch (DE); Wolfgang Kinzelmann, Schlier/Hintermoos (DE); Ingo Mueller, Schweinfurt (DE); Hans-Juergen Moesch, Tettnang (DE); Jens Vortmeyer, Preussisch Oldendorf (DE); Lutz Pydde, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 673 days.

(21) Appl. No.: 11/571,801

(22) PCT Filed: Jul. 5, 2005

(86) PCT No.: PCT/DE2005/001180
§ 371 (c)(1),
(2), (4) Date: Jan. 8, 2007

(87) PCT Pub. No.: WO2006/005309
PCT Pub. Date: Jan. 19, 2006

(65) Prior Publication Data
US 2009/0166990 A1 Jul. 2, 2009

(30) Foreign Application Priority Data
Jul. 7, 2004 (DE) ........................ 10 2004 032 744

(51) Int. Cl.
*B60G 21/055* (2006.01)
(52) U.S. Cl. .............................. 280/5.511; 280/124.107
(58) Field of Classification Search ............... 280/5.506, 280/5.511, 124.106, 124.107
See application file for complete search history.

(56) References Cited

U.S. PATENT DOCUMENTS 6,428,019 B1 * 8/2002 Kincad et al. ............. 280/5.511

(Continued)

FOREIGN PATENT DOCUMENTS

DE 101 26 928 A1 12/2002

(Continued)

*Primary Examiner*—Paul N Dickson
*Assistant Examiner*—Karen Jane J Amores
(74) *Attorney, Agent, or Firm*—McGlew and Tuttle, P.C.

(57) ABSTRACT

A stabilizer is provided for a motor vehicle with two shafts (2, 3), which extend in the transverse direction of the vehicle, can be coupled with one another via a mechanical coupling (40) and are in functional connection with wheels of the motor vehicle with their ends facing away from the coupling (40). A first shaft is connected to a first coupling portion designed as a locking disk and a second shaft is connected to a second coupling portion, which cooperates with the locking disk (7) and is designed as a locking device (8). The locking device (8) has a ratchet element (12A, 12B), which can be actuated by a cam disk (11) that can be rotatingly driven by a drive source (15) against a spring means, and a blocking member (13A, 13B) connected thereto, via which the shafts are connected in such a way that they rotate in unison in a first end position of the cam disk (11) because of a positive connection between the locking disk and the blocking member (12A, 12B), and the positive connection is abolished in a second end position of the cam disk (11). The ratchet element (12A, 12B) is designed according to the present invention with two lever arms (12A_1, 12A_2, 12B-1, 12B_2), which are rigidly connected to one another and are designed with a contact area (12A_1A, 12A_2A, 12B_1A, 12B_2A) each, via which the lever arms (12A_1, 12A_2, 12B_1, 12B_2) are in contact with the cam disk (11).

21 Claims, 5 Drawing Sheets

U.S. PATENT DOCUMENTS

| | | | |
|---|---|---|---|
| 6,513,819 B1 * | 2/2003 | Oliver et al. | 280/124.152 |
| 6,550,788 B2 * | 4/2003 | Schmidt et al. | 280/5.511 |
| 6,651,991 B2 * | 11/2003 | Carlstedt et al. | 280/5.511 |
| 6,805,361 B2 * | 10/2004 | Germano et al. | 280/5.511 |
| 6,874,792 B2 * | 4/2005 | Vortmeyer et al. | 280/5.511 |
| 2003/0122342 A1 | 7/2003 | Germano et al. | |
| 2009/0091094 A1 * | 4/2009 | Sano | 280/5.511 |

FOREIGN PATENT DOCUMENTS

| | | |
|---|---|---|
| EP | 1 236 592 A2 | 9/2002 |

* cited by examiner

STABILIZER FOR A MOTOR VEHICLE

CROSS REFERENCE TO RELATED APPLICATIONS

This application is a United States National Phase application of International Application PCT/DE2005/001180 and claims the benefit of priority under 35 U.S.C. §119 of German Patent Application 10 2004 032 744.0 filed Jul. 7, 2004, the entire contents of which are incorporated herein by reference.

FIELD OF THE INVENTION

The present invention pertains a motor vehicle stabilizer with two shafts, which extend in the transverse direction of the vehicle and with a mechanical coupling for coupling the two shafts together

BACKGROUND OF THE INVENTION

A stabilizer of the type mentioned in the introduction, which stabilizer has a torsion spring rod split into two shafts, which can be connected to one another via a mechanical coupling, is known from DE 101 26 928 A1. The coupling is provided with a locking disk, which is connected to a first shaft in such a way that they rotate in unison, and on the circumference of which at least one locking area is formed. Furthermore, a housing connected to the second shaft in such a way that they rotate in unison is provided. At least one locking means, which has a design complementary to the locking area of the locking disk and meshes with the locking area in the coupled state of the coupling such that the coupling is closed and the two shafts are connected to one another in such a way that they rotate in unison, is mounted movably at the housing.

Furthermore, a spring, by which the locking means is pretensioned in the direction of the locking disk, is connected to the housing and to the locking means. A release means with a drive source, which is connected to the housing and by means of which the locking means is kept disengaged from the locking area in the uncoupled state against the force applied by the spring, is provided for switching over between the coupled state and the uncoupled state of the coupling.

However, the stabilizer known from the state of the art has the drawback that the locking means, which is guided out of engagement with the locking disk during the uncoupling operation of the coupling against the force of the spring and against an additional holding force resulting from the friction between the locking means and the locking disk, is accelerated, after the frictional force or the additional holding force has been overcome, in such a way that the locking means is abruptly disengaged from the locking disk and comes into contact with the housing of the stabilizer at a high velocity, which leads to blows that are undesired and felt as uncomfortable by a driver.

SUMMARY OF THE INVENTION

The basic object of the present invention is therefore to make available a stabilizer for a motor vehicle, in which no blows that compromise the driving comfort occur during the actuation.

This object is accomplished according to the present invention with a stabilizer for a motor vehicle, which is designed with two shafts, which extend in the transverse direction of the vehicle and can be coupled with one another via a mechanical coupling, wherein the shafts are each in functional connection by their ends facing away from the coupling with tires of the vehicle and a first shaft is connected to a first coupling half (portion) designed as a locking disk and a second shaft is connected to a second coupling portion, which cooperates with the locking disk and is designed as a locking means, wherein the locking means has a ratchet element, which can be actuated by a cam disk that can be rotatingly driven by a drive source against a spring means, and a blocking member, which is connected thereto and via which the shafts are connected in such a way that they rotate in unison in a first end position of the cam disk because of a positive connection between the locking disk and the blocking member, and the positive connection is released in a second end position of the cam disk, can be advantageously uncoupled or disengaged such that the uncomfortable blows known from the state of the art are avoided.

This is achieved by the ratchet element being embodied with two lever arms, which are rigidly connected to one another and have a common fulcrum point, the lever arms being designed with a contact area each, via which the lever arms are in contact with the cam disk.

This means that the blocking member connected to the ratchet element can be caused to mesh with the locking disk or to disengage the locking disk depending on a rotation of the cam disk and the motion of the ratchet element is in such a way exactly defined because of the double contact between the cam disk and the ratchet element in the area of the contact areas of the lever arms that the ratchet element is prevented from being lifted off from the cam disk in the contact areas of the lever arms in a simple manner even after the holding force resulting from the frictional force between the blocking member and the locking disk has been overcome.

Further advantages and embodiments of the subject according to the present invention appear from the patent claims and the exemplary embodiments described essentially with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
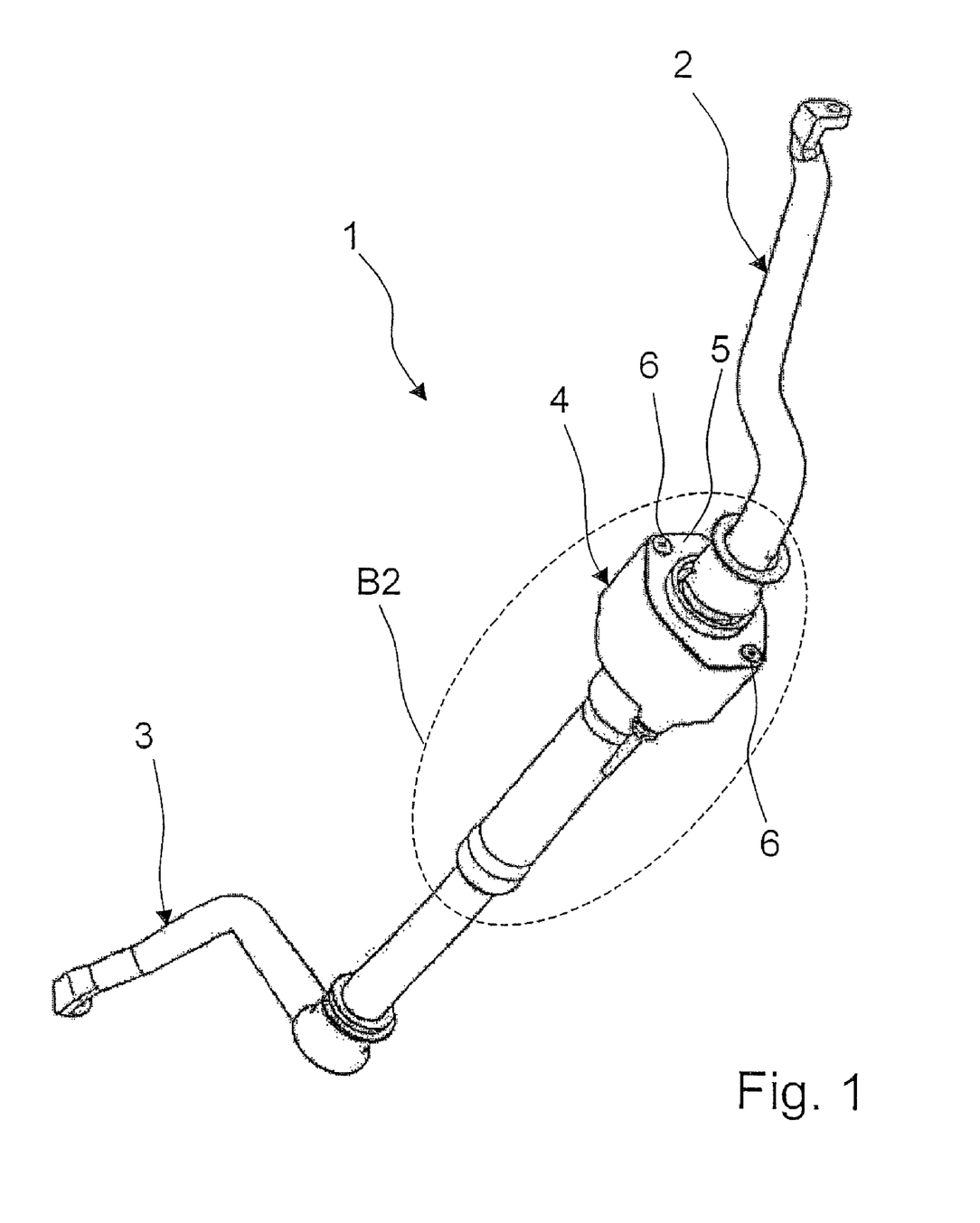
FIG. 1 is a three-dimensional view of a stabilizer designed according to the present invention for a motor vehicle.
Figure 2:
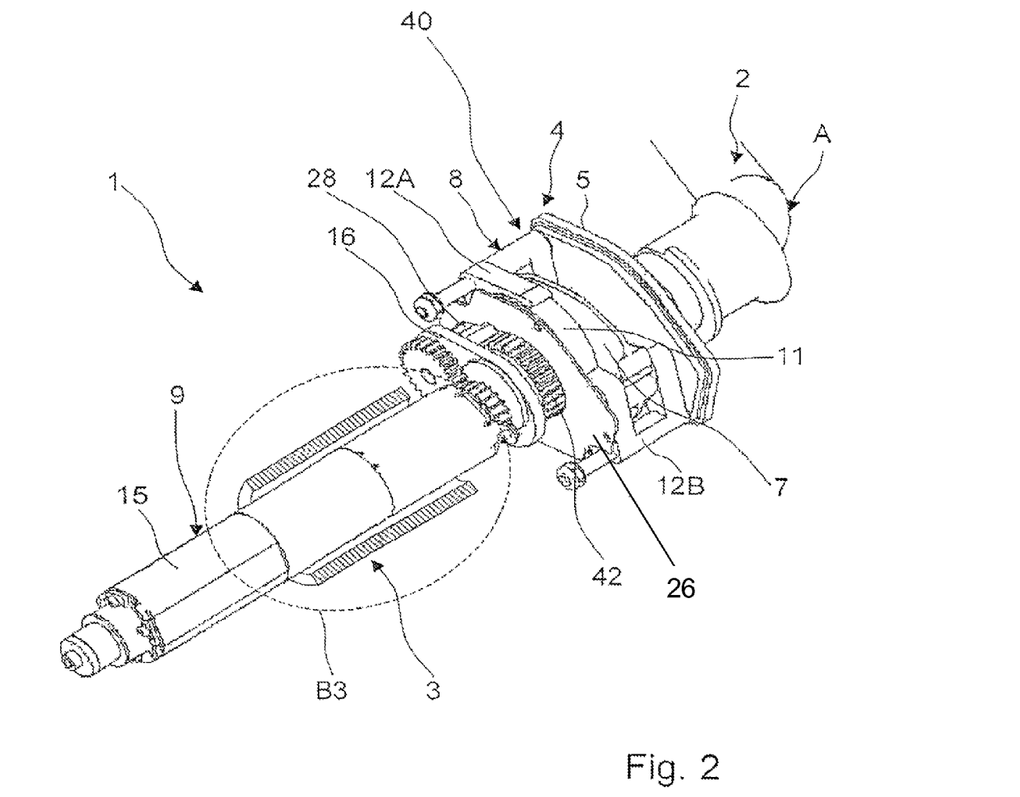
FIG. 2 is an area B2 marked more specifically in FIG. 1 in an enlarged three-dimensional partial sectional view.

Referring to the drawings in particular, FIG. 1 shows a three-dimensional view of a stabilizer 1 designed according to the present invention for a motor vehicle, which stabilizer is designed with two shafts 2, 3, which extend in the transverse direction of the vehicle in the installed position and can be coupled with one another via a mechanical coupling 40 shown more specifically in FIG. 2. The two shafts 2, 3 form a torsion rod in the closed or coupled state of the coupling 40 arranged in a housing 4 and are led here into the housing 4 by their ends, which can be connected to one another via the coupling 40, the two shafts 3 being connected to the housing 4 in such a way that they rotate in unison. The housing 4 is closed with a housing cover 5, in which the first shaft 2 is mounted rotatably, by means of screws 6.

The first shaft 2 and the second shaft 3 can also be separated from one another via the mechanical coupling 40 such that the first shaft 2 is rotatable in relation to the second shaft 3 within a predefined angular range. This state of the coupling 40 will hereinafter be called the uncoupled or opened state of the coupling.

At their ends facing away from the housing 4, the shafts 2, 3 are in functional connection with tires of a vehicle axle of the vehicle in a known manner, and torsional flexing of the vehicle axle with the coupling closed is greatly compromised by the now active stabilizer 1. The closed state of the stabilizer 1 is preferred during the operation of the vehicle on normal roads and at higher speeds of the vehicle for reasons of better directional stability.

However, if the vehicle is operated off-road, the coupling 40 is opened to deactivate the mode of action of the stabilizer 1, which mode is known per se, so that torsional flexing of the vehicle axle is possible to a substantially greater extent than in the activated state of the stabilizer 1, as a result of which good traction continues to be achieved when the vehicle is on highly uneven ground, because the two tires remain essentially in contact with the ground even in case of greater unevennesses.

To make it possible to carry out the above-described actuation for activating and deactivating the stabilizer 1, the first shaft 2 is connected, in the manner shown in FIG. 2, to a first coupling portion designed as a locking disk 7 and the second shaft 3 is connected to a second coupling portion of the coupling 40, which said second coupling portion cooperates with the locking disk 7 and is designed as a locking device or locking means 8. The locking means 8 is designed here with two ratchet elements 12A and 12B, which can be actuated by a cam disk 11, which can be rotatingly driven by a drive source 9 against the spring means 10 shown in more detail in FIG. 3, and with two blocking members 13A and 13B each, which are connected thereto and are shown in more detail in FIG. 4, the cam disk 11 being mounted rotatably on the locking disk 7.

With the coupling 40 closed, a positive connection each is formed between the locking disk 7 and the blocking members 13A and 13B and the shafts 2 and 3 are connected to one another in such a way that they rotate in unison in a first end position of the cam disk 11, which is equivalent to the closed state of the coupling 40. When the coupling 40 is opened, the positive connection between the blocking members 13A and 13B and the locking disk is released, and the cam disk 11 is in a second end position equivalent to the opened state of the coupling 40.

The two ratchet elements 12A and 12B, which are rigidly connected to the housing 4, are each embodied with two lever arms 12A_1, 12A_2 and 12B_1, 12B_2, which are rigidly connected to one another and have a common fulcrum point 14A, 14B each. Moreover, the lever arms 12A_1, 12A-2 and 12B_1, 12B_2 are designed each with a contact area 12A_1A, 12A_2A and 12B_1A, 12B_2A, in which the lever arms 12A_1, 12A_2 and 12B_1, 12B_2 are each simultaneously in contact with the cam disk 11, so that rotation of the cam disk 11 brings about rotation of the ratchet elements 12A and 12B about corresponding fulcrum points 14A and 14B, respectively, without the double contact between the ratchet elements 12A and 12B and the cam disk 11 being interrupted.

The two fulcrum points 14A and 14B of the ratchet elements 12A and 12B are formed here by the screws 6A and 6B, which are provided to fix the housing cover 5 on the housing 4, so that the ratchet elements 12A and 12B are rigidly connected to the housing 4 and thus also to the second shaft 3.

Figure 3:
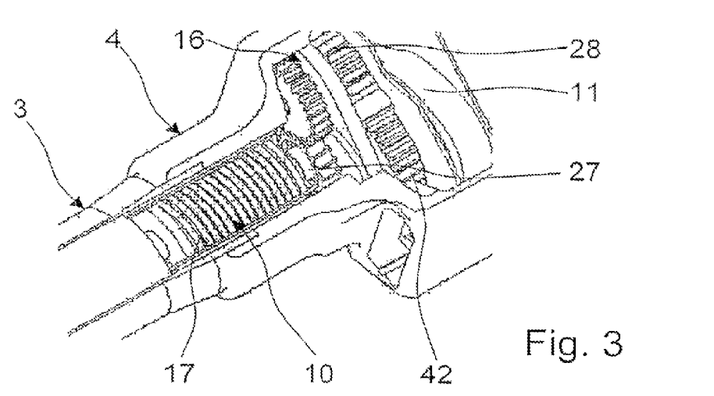
FIG. 3 is an area B3 marked more specifically in FIG. 2 in a three-dimensional partial sectional view.

It is seen from the view shown in FIG. 2 that the second shaft 3 is designed in some areas as a hollow shaft or tube, in the interior space of which the drive source 9 is integrated, which is designed with an electric motor 15 and is in functional connection with a cam disk 11 for driving the cam disk 11 against a spring force of the spring means 10, which is shown in more detail in FIG. 3 and is designed with a coil spring 17 via a transmission means 16, which is designed as a two-speed transmission here.

The coil spring 17 with its end facing the electric motor 15 is rigidly connected to the housing and is increasingly pretensioned during a rotary motion originating from the electric motor 15, which motion adjusts the cam disk 11 from the first end position equivalent to the closed state of the coupling 40 of the stabilizer 1 in the direction of the second end position equivalent to the opened state of the coupling 40. This pretensioning causes the spring means 10 to return from the second end position into its first end position when the electric motor 15 is not energized and the blocking members 13A and 13B of the two ratchet elements 12A and 12B overlap locking funnels 18A, 18B of the locking disk 7, which correspond to them and are shown more specifically in FIG. 7, such that the blocking members 13A and 13B can be snapped into the locking funnels 18A and 18B or can be caused to mesh with the locking disk 7.

At its end facing away from the electric motor 15, the coil spring 17 of the spring means 10 is connected to a motor output shaft 27 of the electric motor 15, the motor output shaft 27 being in functional connection with the rotor of the electric motor 15 in a manner not shown more specifically, so that the spring force of the spring means 10, which acts in the closing direction of the coupling 40, can be applied to the cam disk 11. The cam disk 11 is provided, on its side facing the transmission unit 16, with a gear, which is part of the transmission unit 16 and meshes with another gear 28 of the transmission unit 16.

The two-speed transmission unit 16 is used to increase the drive torque of the electric motor 15, on the one hand, and to bridge over a mismatch that may possibly exist between the electric motor 15 and the cam disk 11 in the area between the axis of rotation of the motor output shaft 27 and the cam disk 11.

Figure 4:
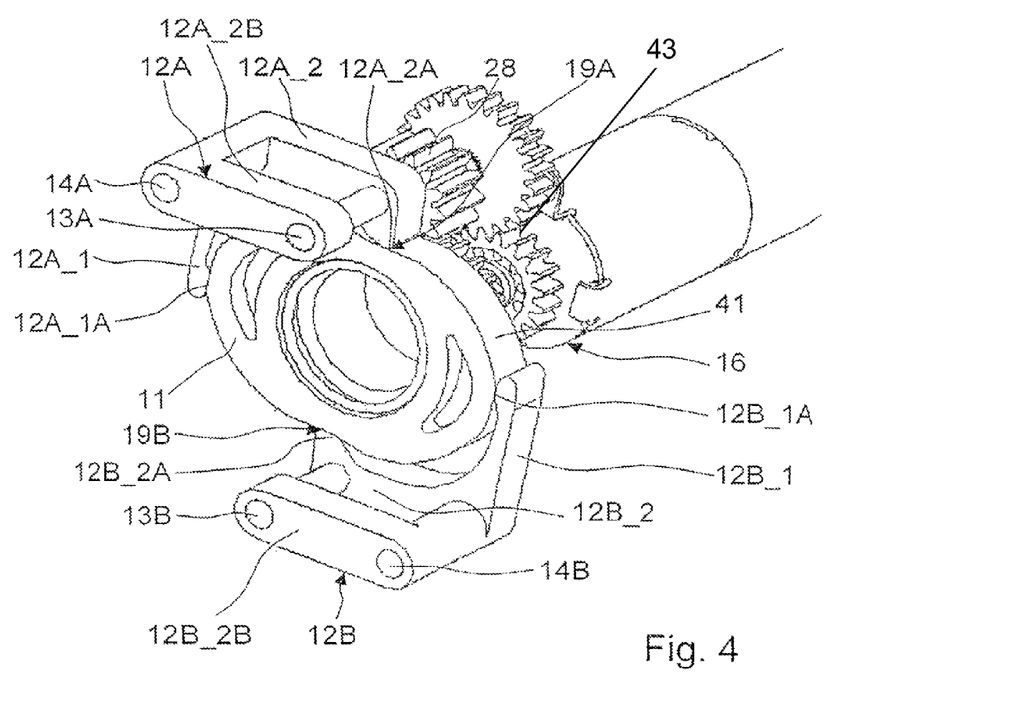
FIG. 4 is a cam disk of the stabilizer according to FIG. 1, which cam disk cooperates with two ratchet elements.

FIG. 4 shows the two ratchet elements 12A and 12B as well as the cam disk 11 in a three-dimensional view from the view indicated more specifically by arrow A shown in FIG. 2. Furthermore, the cam disk 11 as well as one of the two ratchet elements 12A and 12B, which are essentially of identical design, are shown in themselves in FIG. 5 and FIG. 6.

Figure 5:
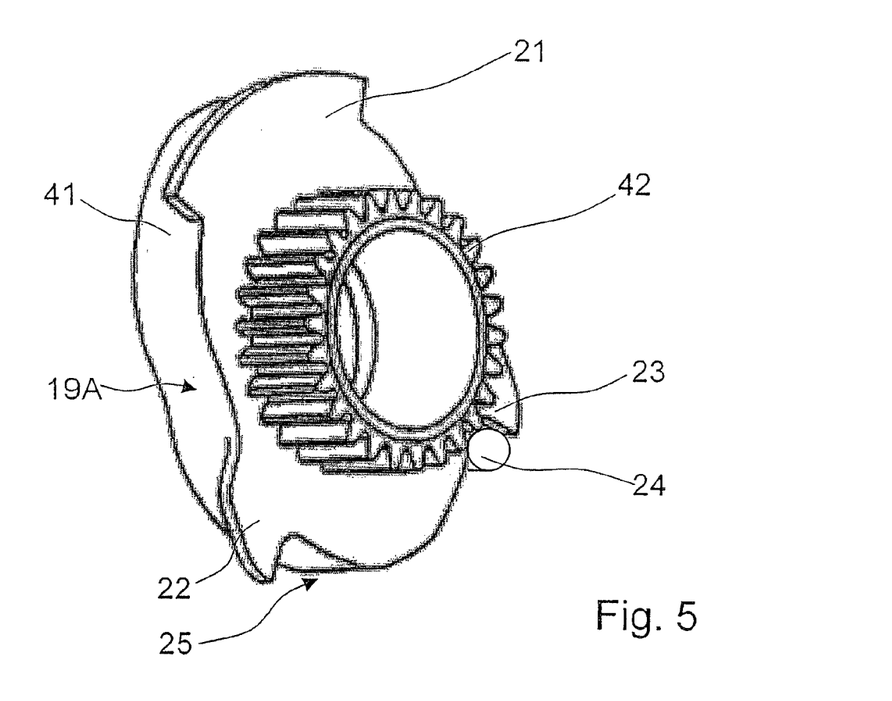
FIG. 5 is an individual three-dimensional view of the cam disk shown in FIG. 4.

It appears from the view of the cam disk 11 according to FIG. 4 and FIG. 5 that the cam disk 11 has an essentially elliptical design and is designed with a contraction 19A and 19B, respectively, on both sides in the area of its small semi-axes. The cam disk 11 with its degenerate elliptical contour represents a control path 41 for the two ratchet elements 12A and 12B, which are in contact with the convexly shaped contact areas 12A_1A, 12A_2A and 12B_1A and 12B_1A without clearance by their lever arms 12A_1, 12A_2 and 12B_1 and 12B_2 on their side facing the control path 41 in the manner shown in FIG. 4, so that the ratchet elements 12A and 12B are pivoted about their respective fulcrum point 14A and 14B in an exactly predefined manner when they run over the control path 41 of the cam disk 11, which said control path is designed with different radii of curvature over the circumference of the cam disk 11.

The two contractions 19A and 19B cause that during the rotation of the cam disk 11, the blocking members 13A and 13B are first guided out of meshing with the locking disk 7 relative to the locking disk 7 at first essentially radially outwardly, i.e., at right angles to the axis of rotation of the cam disk 11, from their first end position, which is equivalent to the closed state of the coupling 40, in which the blocking members 13A and 13B mesh with the locking disk 7, the blocking members 13A and 13B describing a curved path with a large curve radius.

It is thus guaranteed that flanks 20A, 20B of the locking funnels 18A and 18B can be embodied with such steep angles of incidence that the positive connection existing between the blocking members 13A and 13B and the locking disk 7 in the closed state of the coupling 40 makes available a strong blocking action between the two shafts 2 and 3 of the stabilizer 1.

Furthermore, the cam disk 11 is designed with three collar-like areas 21, 22 and 23 extending over some sections in the circumferential direction, the two collar-like areas 22 and 23 being provided as stops for a bolt 24, which is rigidly connected to the housing. A control groove 25 is formed between the two collar-like areas 22 and 23, which said control groove extends over a predefined angle segment and is meshed with the bolt 24, which is a rigid part of the housing, in such a way that the cam disk 11 is in one of the above-described end positions when the bolt 24 is in contact with one of the collar-like areas or stops 22 or 23 and cannot be rotated further in the direction blocked by the particular collar-like area 22 or 23.

By contrast, the collar-like area 21 is in this case part of a display means, which cooperates with position recognition sensors of the display means, which said sensors are arranged on a board 26 shown in more detail in FIG. 2 such that a current position of the cam disk 11 can be determined by means of the position recognition sensors, which are preferably designed as Hall sensors here. The two Hall sensors are positioned next to each other in the direction of rotation of the cam disk 11 in a manner not shown more specifically such that the motion and the current position of the cam disk 11 can be determined in a simple manner by means of milled slots arranged, for example, in the collar-like area 21.

Figure 6:
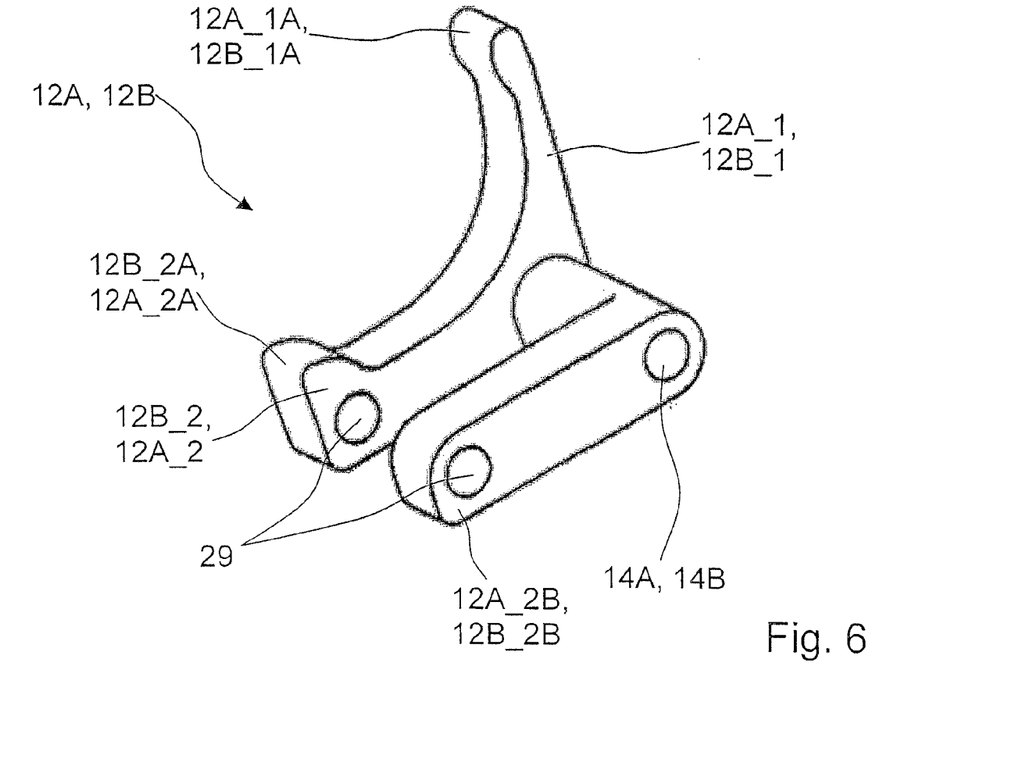
FIG. 6 is an individual three-dimensional view of a ratchet element of the stabilizer.

FIG. 6 shows as an example one of the ratchet elements 12A and 12B having identical design. It appears from this enlarged individual view of the ratchet element 12A or 12B that the convexly shaped contact areas 12A_1A, 12A_2A, 12B_1A, 12B_2A of the lever arms 12A_1, 12_2, 12B_1, 12B_2 are made so flat over the width of the lever arms 12A_1 and 12A_2 that there is a linear contact between the control path 41 of the cam disk 11 and the ratchet elements 12A and 12B in the contact areas 12A_1A, 12A_2A, 12B_1A, 12B_2A. It is thus guaranteed that, on the one hand, a friction force, which develops between the control path 41 and the contact areas 12A_1A, 12A_2A and 12B_1A and 12B_2A during the rotary motion of the cam disk 11 and opposes the rotary motion of the cam disk 41, is low and, on the other hand, a tilting motion of the ratchet elements 12A and 12B, the control force acting on the ratchet elements 12A and 12B from the control path 41 of the cam disk 11, and torques, which are introduced into the ratchet elements 12A and 12B and occur due to the engagement of the blocking elements 13A and 13B with the locking disk 7, is reduced.

In addition, the ratchet elements 12A and 12B are designed, according to the view shown in FIG. 6, with partial lever arms 12A_2B, 12B_2B, which extend in parallel to the lever arms 12A_2 and 12B_2 and form a mount 29 each for the blocking members 13A and 13B with the lever arms 12A_2 and 12B_2 and are located at spaced locations from the lever arms 12A_2 and 12B_2 in the area of the mount 29. Thus, a force acting on the blocking member 13A in the radial direction or at right angles to the central axis of the locking disk 7 is better counteracted, because the forces acting on the blocking members 13A and 13B can be supported better via the broadened mount 29 and can be better introduced into the housing 4 of the stabilizer 1 via the respective ratchet element 12A and 12B.

It is, of course, at the discretion of the person skilled in the art to fill the slot present between the lever arm 12A_2 or 12B_2 and the partial lever arm 12A_2B or 12B_2B with material depending on the particular application, the embodiment of the ratchet element 12A and 12B shown in FIG. 6 being characterized by a lower component weight because of the reduced amount of material used.

Figure 7:
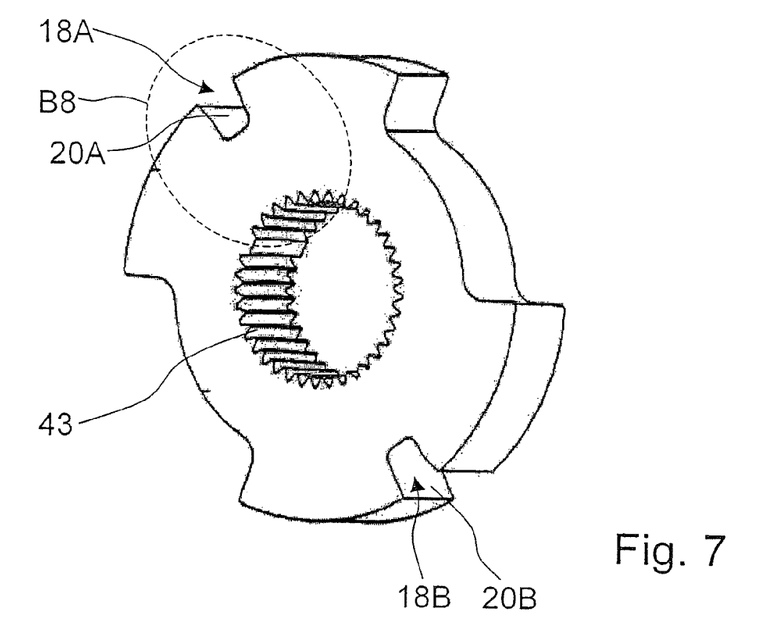
FIG. 7 is an individual three-dimensional view of a locking disk of the stabilizer according to FIG. 1, which locking disk cooperates with a blocking member connected to a ratchet element.
Figure 8:
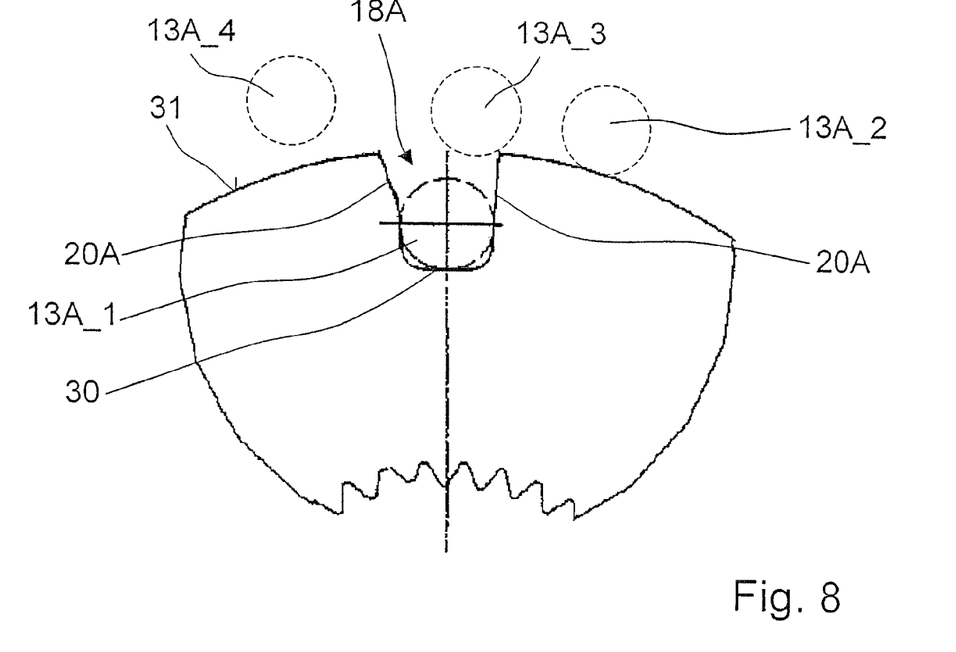
FIG. 8 is an enlarged individual view of an area B8 marked more specifically in FIG. 7.

FIG. 7 shows the locking disk 7, which is connected to the first shaft 2 in such a way that they rotate in unison, in an enlarged individual view, FIG. 8 showing, in turn, the area B8 marked more specifically in FIG. 7 in an enlarged individual view. The blocking member 13A is shown in FIG. 8 in reference to the locking disk 7 in four different positions, the four different positions of the blocking member 13A being shown more specifically under the reference numbers 13A_1, 13A_2, 13A_3 and 13A_4.

The coupling 40 is closed in the position of the blocking member 13A shown under 13A_1, because the blocking member 13A is located entirely in the locking funnel 18A in this position and is in contact with the flanks 20A as well as with the lower limiting surface 20 of the locking funnel 18A without clearance. This means that a mode of action of the stabilizer 1 with the coupling 40 closed is characterized only by the component elasticities of the different assembly units of the stabilizer 1 and an undefined mode of action of the stabilizer 1 due to an undesired clearance in the contact area between the blocking members 13A and 13B, on the one hand, and the locking disk 7, on the other hand, is avoided to the greatest extent possible.

The coupling 40 between the two shafts 2 and 3 is completely opened and the shafts 2 and 3 are rotated against one another in the position of the blocking member 13A shown under reference number 13A_4. The completely opened or uncoupled state of the stabilizer 1 is characterized here by the distance present between the outer side 31 of the locking disk 7 and the blocking member 13A, at which the blocking member 13A is pivoted by the ratchet element 12A completely out of the range of action of the locking disk 7.

In the position of the blocking member 13A shown in more detail under reference number 13A_2, the coupling 40 is in a so-called preliminary coupled state or preliminary closed state. The blocking member 13A is no longer maintained in this case at a spaced location from the surface 31 of the locking disk 7 by the ratchet element 12A in the position shown under the reference number 13A_4, but is in contact with the outer side 31 of the locking disk 7 without clearance. This state of the coupling 40 and of the blocking member 13A occurs when the two shafts 2, 3 are rotated in relation to one another. No acting adjusting force that would bring the blocking member 13A into its position 13A_1 equivalent to the opened state of the coupling is applied by the electric motor 15 in this operating state of the stabilizer 1.

If the torsional flexing of the stabilizer 1 is reduced by a correspondingly even ground under the vehicle, so that the blocking member 13A is brought, for example, into the position shown under 13A_3, the cam disk 11 can be rotated by the spring means 10 in the direction of its end position equivalent to the closed state of the coupling 40 until the blocking member 13A is also adjusted radially in the direction of the central axis of the locking disk 7. Since the two shafts 2 and 3 are rotated in relation to one another in the position of the blocking member 13A shown under 13A_2 such that the locking funnel 18A does not overlap the blocking member 13A, the coupling 40 can be brought into its closed state only when the blocking member 13A comes to overlap the locking funnel 18A of the locking disk 7 at least partially in the manner shown under 13A_3 due to rotation of both shafts 2 and 3.

This means that rotation between the two shafts 2 and 3, which is necessary to definitively close the coupling 40 and hence to lock the stabilizer 1, can be brought about by the spring force of the spring means 10 alone if the coil spring 17 is dimensioned correspondingly.

If the spring force of the spring means 10 alone is strong enough to close the coupling 40 starting from the position of the blocking member 13A shown under reference number 13A_3, provisions may be made for the additional actuating force to be applied by means of the electric motor 15.

The stabilizer 1 shown in FIG. 1 is designed in this case as an electromechanical system, in which the electric motor 15 rotates the cam disk 11 against the spring means 10 embodied with the coil spring 17 by preferably 120° against the stops formed by the collar-like areas 22 and 23. The two ratchet elements 12A and 12B with their blocking members 13A and 13B are moved by means of the cam disk 11 out of the locking funnels 18A and 18B of the locking disk 7, while the blocking members 13A and 13B are located in the locking funnels 18A and 18B of the locking disk 7 when the system is not actuated.

If the cam disk 11 is adjusted from its first end position, in which the stabilizer 1 is coupled, into its second end position, in which the blocking members 13A and 13B are lifted out of the locking funnels 18A and 18B of the locking disk 7 by the ratchet elements 12A and 12B, the stabilizer 1 is uncoupled and the stabilizer action, which hinders the torsional flexing of the vehicle axle, is eliminated. The electric motor 15 continues to be energized in this state of the coupling 40 in order to maintain the stabilizer 1 in its uncoupled state and to successfully counteract the spring force of the spring means 10 acting in the closing direction of the coupling 40.

The above-described embodiment of the electromechanical system or of the stabilizer 1 represents such a fail-safe mechanism that the spring means 10 acting as a restoring spring unit rotates the cam disk 11 in case of power failure of the power supply system starting from its end position equivalent to the opened state of the coupling 40 into its end position equivalent to the closed state of the coupling. The blocking members 13A and 13B are then again pushed into the locking funnels 18A and 18B of the locking disk 7 when the above-described, at least partial overlap with the locking funnels is present, so that the stabilizer 1 is again coupled and the stabilizer action is restored.

In case of torsionally flexed axles or twisted stabilizer 1, in which case the above-described, at least partial overlap between the blocking members 13A and 13B and the locking funnels 18A and 18B is not present, the blocking members 13A and 13B cannot be pushed by the spring means 10 into the locking funnels 18A and 18B of the locking disk 7, because the two shafts 2 and 3 are twisted in relation to one another in relation to a zero position, in which the stabilizer 1 is locked, that there is an excessive angular offset between the locking funnels 18A and 18B, on the one hand, and the blocking members 13A and 13B, on the other hand, for closing the coupling.

To close the coupling 40, the zero position, in which there is essentially no spring compression in the vehicle axle designed with the stabilizer 1, is necessary for the spring means 17 to be able, preferably together with the electric motor 15, to push the blocking members 13A and 13B again into the locking funnels 18A and 18B of the locking disk 7 by means of the cam disk 11.

A holding means 32, which is designed as an electric friction brake here and by means of which the cam disk 11 is held in its end position equivalent to the opened state of the stabilizer 1, is activated in the opened state of the coupling 40. It is thus advantageously possible to reduce the energization of the electric motor 15, which is necessary to hold the cam disk 11 in the end position equivalent to the opened state of the stabilizer 1, such that the electric motor 15 will not overheat. Thus, the holding means 32, which establishes here a functional connection between the motor output shaft 27 or the rotor of the electric motor 15 and the second shaft 3 and may, of course, also be designed in any other way other than the embodiment proposed, namely, as an electric friction brake, acts as a means securing the electric motor 15 against a possible thermal overload. The stabilizer may also be designed without the holding means if overload of the electric motor is not given over the entire range of operation of the stabilizer.

If the driver wishes to close the stabilizer 1, for example, by actuating a switch arranged in the passenger compartment, the electric motor 15 and optionally the holding device 32 are deactivated by means of the power control arranged on the board 26 such that the spring means 10 rotates both the electric motor 15 and the cam disk 11 back into the position equivalent to the closed position of the stabilizer starting from the end position equivalent to the opened position of the stabilizer 1 and the blocking members 13A and 13B are again pushed into the locking funnels 18A and 18B of the locking disk 7.

If torsional flexing of the vehicle axle designed with the stabilizer 1 is present, in which case the two shafts 2 and 3 are twisted in relation to one another and which is characterized by such an angular offset between the blocking members 13A and 13B, on the one hand, and the locking funnels 18A and 18B of the locking disk 7, on the other hand, that the blocking members 13A and 13B cannot be brought into the locking funnels 18A and 18B into the position defined under reference number 13B_1 in FIG. 8, the electromechanical system or the stabilizer 1 is brought at first only into a partially active state, i.e., the preliminary closed state, in the above-described manner.

In the latter operating state of the stabilizer, in which the stabilizer 1 cannot be activated, a sensor system, which is likewise arranged on the board 26, detects the current position of the motor output shaft 27 of the electric motor 15 as a function of the determined position of the cam disk 11 and deactivates the electric motor. If the torsional flexing of the vehicle axle is reduced such that there is only an angular offset of up to 1.25°, maximum, between the two shafts 2 and 3 and between the blocking member 13A and 13B, on the one hand, and the locking funnel 18A and 18B, on the other hand, the blocking members 13A and 13B are pushed into the locking funnels 18A and 18B of the locking disk 7 by means of the spring means 17 and possibly with the air of the now again activated or energized electric motor 15, so that the coupling 40 is closed and the stabilizer 1 is again activated.

In case of greater twist angles between the two shafts 2 and 3, the blocking members 13A and 13B of the ratchet elements 12A and 12B cannot be pushed into the locking funnels 18A and 18B of the locking disk 7, the twist angles assumed here between the shafts 2 and 3 or between the locking funnels 18A and 18B, on the one hand, and the blocking members 13A and 13B, on the other hand, being greater than 1.25°. The blocking members 13A and 13B lie on the locking disk 7 in the manner shown under reference number 13A_2 in FIG. 8 in this case.

It is pointed out in this connection that the limit angle of the maximum twist angle between the two shafts 2 and 3, up to which the blocking members can be pushed into the locking funnels corresponding to them in the above-described manner, depends on an opening angle of the particular locking funnel and a coefficient of friction resulting from the material pairing of the blocking members and the locking disk, so that the above-mentioned limit angle may, of course, deviate from the above-mentioned angle value of 1.25°, depending on the particular application.

The power electronic unit for controlling the stabilizer 1, which is arranged on the board 26, is designed in this case with electronic boosting elements, by means of which the signals of the Hall sensors are boosted. Furthermore, the power electronic unit of the board 26 is designed with a separate control device, not shown more specifically, which is connected to a CAN bus of the motor vehicle. The control device is supplied with information on the current speed of the vehicle via the CAN bus. If a predefined critical speed limit value is exceeded, the opened stabilizer 1 is interlocked by closing the coupling 40, so that the stabilization of the motor vehicle, which is necessary for the currently determined speed, is available due to the closed stabilizer 1.

It is pointed out in conclusion that it is at the discretion of the person skilled in the art to design the stabilizer with one ratchet element only or with more than two ratchet elements, in which case the particular number of ratchet elements selected does not lead to any change in the mode of operation of the exemplary embodiment of the stabilizer 1 shown in the drawings and explained in the above description.

While specific embodiments of the invention have been shown and described in detail to illustrate the application of the principles of the invention, it will be understood that the invention may be embodied otherwise without departing from such principles.

The invention claimed is:

1. A stabilizer for a motor vehicle the stabilizer comprising: two shafts, which extend in the transverse direction of the vehicle; and
a mechanical coupling for coupling said two shafts together, the two shafts being in functional connection with tires of the motor vehicle with their ends facing away from said mechanical coupling, said mechanical coupling including a first coupling portion wherein a first shaft of said two shafts is connected to said first coupling portion designed as a locking disk and a second shaft is connected to a second coupling portion, which cooperates with said locking disk and is designed as a locking means, wherein said locking means has a ratchet element, which can be actuated by a cam disk that can be rotatingly driven by a drive source against a spring means, and a blocking member connected thereto, via which said two shafts are connected in such a way that they rotate in unison in a first end position of said cam disk because of a positive connection between said locking disk and said blocking member, and the positive connection is abolished in a second end position of said cam disk, said ratchet element comprising two lever arms, which are rigidly connected to one another and have a common fulcrum point, wherein said lever arms comprise a contact area each, via which said lever arms are in contact with said cam disk, said blocking member comprising a bolt rigidly connected to one of said lever arms.

2. A stabilizer in accordance with claim 1, wherein said contact areas of said lever arms comprise arched contact areas such that an at least approximately linear contact is provided between said lever arms and said cam disk.

3. A stabilizer in accordance with claim 1, wherein said locking disk is connected to the first shaft via a groove toothing.

4. A stabilizer in accordance with claim 1, wherein said locking disk comprises a locking funnel, in which said blocking member is arranged in the closed state of said coupling.

5. A stabilizer in accordance with claim 4, wherein said locking funnel is designed such that said coupling cam be closed by means of said spring means in the presence of an angular offset between said shafts that is smaller than a limit angle that depends on an opening angle of the locking funnel.

6. A stabilizer in accordance with claim 1, wherein said cam disk is mounted rotatably at said locking disk and is connected to said drive source and said spring means via a transmission unit.

7. A stabilizer in accordance with claim 1, wherein said cam disk comprises an elliptical control path, which is designed in an area of a small semiaxes with contractions and on which said lever arms are guided with contact areas such that said blocking member is moved essentially radially outwardly during a rotary motion of said cam disk starting from a position equivalent to a closed state of said coupling in relation to said locking disk and is moved out of said locking funnel of said locking disk in the process.

8. A stabilizer in accordance with claim 1, wherein said cam disk is provided on its circumference with a plurality of collar-like areas extending in sections in the circumferential direction, wherein two said collar-like areas are provided as stops for a bolt, which is a rigid part of the housing, and wherein a control groove, which extends over a defined angle segment and is meshed with said bolt such that said cam disk is located in one of said end positions when said bolt is in contact with one of said stops, is formed between said two stops.

9. A stabilizer in accordance with claim 1, wherein said cam disk comprises a display means, which cooperates with position recognition sensors such that a current position of said cam disk can be determined by means of the position recognition sensors.

10. A stabilizer in accordance with claim 9, wherein said position recognition sensors comprise Hall sensors.

11. A stabilizer in accordance with claim 1, wherein said drive source and said spring means are arranged in said second shaft, which is designed, at least in some areas, as a hollow shaft.

12. A stabilizer in accordance with claim 1, wherein said spring means comprises a coil spring, which is pretensioned in the installation position such that said coil spring actuates said cam disk in a direction in which said coupling will be closed.

13. A stabilizer in accordance with claim 1, wherein said drive source comprises an electric motor.

14. A stabilizer in accordance with claim 1, wherein said lever arm, of said ratchet element connected to said blocking member has a partial lever arm extending in parallel thereto.

15. A stabilizer in accordance with claim 1, wherein the functional connection between said cam disk and said spring means comprises such a holding means that said cam disk can be held in the current position against the spring force of said spring means.

16. A stabilizer in accordance with claim 15, wherein said holding means comprises a brake acting on the rotor of said electric motor.

17. A stabilizer in accordance with claim 9, wherein the position recognition sensors are arranged on a board, on which additional electronic components for amplifying the signals of the position recognition sensors are arranged.

18. A stabilizer in accordance with claim 9, wherein said board comprises a control device, which is connected to a CAN bus of the motor vehicle, so that said coupling is closed when a critical speed of the vehicle is exceeded depending on actuation by means of the control device.

19. A stabilizer for a motor vehicle the stabilizer comprising:
two shafts, which extend in the transverse direction of the vehicle; and
a mechanical coupling for coupling said two shafts together, the two shafts being in functional connection with tires of the motor vehicle with their ends facing away from said mechanical coupling, said mechanical coupling including a first coupling portion wherein a first shaft of said two shafts is connected to said first coupling portion designed as a locking disk and a second shaft is connected to a second coupling portion, which cooperates with said locking disk and is designed as a locking means, wherein said locking means has a ratchet element, which can be actuated by a cam disk that can be rotatingly driven by a drive source against a spring means, and a blocking member connected thereto, via which said two shafts are connected in such a way that they rotate in unison in a first end position of said cam disk because of a positive connection between said locking disk and said blocking member, and the positive connection is abolished in a second end position of said cam disk, said ratchet element comprising two lever arms, which are rigidly connected to one another and have a common fulcrum point, wherein said lever arms comprise a contact area each, via which said lever arms are in contact with said cam disk, said cam disk comprising an elliptical control path, which is designed in an area of small semiaxes with contractions and on which said lever arms are guided with contact areas such that said blocking member is moved essentially radially outwardly during a rotary motion of said cam disk starting from a position equivalent to a closed state of said coupling in relation to said locking disk and is moved out of said locking funnel of said locking disk in the process.

20. A stabilizer for a motor vehicle the stabilizer comprising:
two shafts, which extend in the transverse direction of the vehicle; and
a mechanical coupling for coupling said two shafts together, the two shafts being in functional connection with tires of the motor vehicle with their ends facing away from said mechanical coupling, said mechanical coupling including a first coupling portion wherein a first shaft of said two shafts is connected to said first coupling portion designed as a locking disk and a second shaft is connected to a second coupling portion, which cooperates with said locking disk and is designed as a locking means, wherein said locking means has a ratchet element, which can be actuated by a cam disk that can be rotatingly driven by a drive source against a spring means, and a blocking member connected thereto, via which said two shafts are connected in such a way that they rotate in unison in a first end position of said cam disk because of a positive connection between said locking disk and said blocking member, and the positive connection is abolished in a second end position of said cam disk, said ratchet element comprising two lever arms, which are rigidly connected to one another and have a common fulcrum point, wherein said lever arms comprise a contact area each, via which said lever arms are in contact with said cam disk, said drive source and said spring means being arranged in said second shaft, which is designed, at least in some areas, as a hollow shaft.

21. A stabilizer for a motor vehicle the stabilizer comprising:
two shafts, which extend in the transverse direction of the vehicle; and
a mechanical coupling for coupling said two shafts together, the two shafts being in functional connection with tires of the motor vehicle with their ends facing away from said mechanical coupling, said mechanical coupling including a first coupling portion wherein a first shaft of said two shafts is connected to said first coupling portion designed as a locking disk and a second shaft is connected to a second coupling portion, which cooperates with said locking disk and is designed as a locking means, wherein said locking means has a ratchet element, which can be actuated by a cam disk that can be rotatingly driven by a drive source against a spring means, and a blocking member connected thereto, via which said two shafts are connected in such a way that they rotate in unison in a first end position of said cam disk because of a positive connection between said locking disk and said blocking member, and the positive connection is abolished in a second end position of said cam disk, said ratchet element comprising two lever arms, which are rigidly connected to one another and have a common fulcrum point, wherein said lever arms comprise a contact area each, via which said lever arms are in contact with said cam disk, said cam disk comprising a display means, which cooperates with position recognition sensors such that a current position of said cam disk can be determined by means of the position recognition sensors, said position recognition sensors being arranged on a board, on which additional electronic components for amplifying the signals of the position recognition sensors are arranged.

* * * * *